United States Patent [19]

Scaglietti

[11] Patent Number: 4,874,201
[45] Date of Patent: Oct. 17, 1989

[54] SUPPORT AND GUIDE STRUCTURE FOR THE WINDOWS OF A MOTOR VEHICLE BODY

[75] Inventor: Oscar Scaglietti, Montale di Castelnuovo Rangone, Italy

[73] Assignee: Ferrari Engineering S.p.A., Modena, Italy

[21] Appl. No.: 207,247

[22] Filed: Jun. 16, 1988

[30] Foreign Application Priority Data

Jun. 16, 1987 [IT] Italy .................... 67512 A/87

[51] Int. Cl.$^4$ .............................................. B60J 5/04
[52] U.S. Cl. ..................................... 296/201; 296/146; 49/374; 49/502
[58] Field of Search ............... 296/201, 146; 49/227, 49/374, 440, 502

[56] References Cited

U.S. PATENT DOCUMENTS

| 4,483,100 | 11/1984 | Blankenburg et al. | 49/374 |
| 4,509,293 | 4/1985 | Ufrecht et al. | 49/502 |
| 4,688,847 | 8/1987 | Freudenberg | 296/146 |
| 4,691,476 | 9/1987 | Yao et al. | 49/374 |
| 4,697,386 | 10/1987 | Watanabe et al. | 49/374 |

Primary Examiner—Robert R. Song
Attorney, Agent, or Firm—Shlesinger & Myers

[57] ABSTRACT

The structure comprises a pair of support elements for the window each of which has an abutment tongue which can be contacted by part of the rear surface of the window, a frame tongue orthogonal to the first and adapted to surround the lateral edge of the window, a guide tongue parallel to the abutment tongue and disposed rearwardly of this, and a connection wall connecting the abutment tongue and the guide tongue together; the structure further includes a pair of guide elements each of which is adapted to guide a corresponding support element during movement of the window, and each of which comprises a pair of parallel guide tongues defining with a base wall, a guide channel for a guide tongue of a corresponding window support element, each of the said guide elements being fixed to a corresponding upright of the door.

11 Claims, 3 Drawing Sheets

SUPPORT AND GUIDE STRUCTURE FOR THE WINDOWS OF A MOTOR VEHICLE BODY

BACKGROUND OF THE INVENTION

The present invention relates to a support and guide structure for the windows of a motor vehicle body having at least one door with a substantially vertically movable window which is delimited by lateral edges and an upper edge.

Structures of this type are known by means of which the window is held in a position such as to locate its outer surface substantially flush with the outer surface of the upright and upper cross piece of the door from the purpose of reducing the aerodynamic resistance of the vehicle in motion.

Known structures of this type, which normally comprise a plurality of guide elements and seal elements of elongate form having a rather complex transverse section have various disadvantages.

First of all, such structures are not able to position the window in such a way as to obtain the condition that the outer surface thereof is rigorously coincident with the outer surface of the uprights and the door cross piece and therefore, for this reason, there are aerodynamic losses in correspondence with the door.

Moreover, the support elements of this structure are always disposed laterally with respect to the edges of the window, in such a way as to form a true and proper frame around the window itself; because of the form and dimensions of these support elements they are themselves a source of further aerodynamic losses.

Further, with such structures it is not possible to achieve continuity between the vertically movable window of a door and the fixed window of the door itself, which is contiguous to the first, nor with the fixed window disposed in the rear part of the motor vehicle body. In fact, between the said fixed window and movable window vertical uprights are present which cannot be masked and which therefore cause discontinuities which are also a source of further aerodynamic losses.

Finally, the known structures are structurally rather complex because of the form of the elements of which they are composed and therefore require particular care and precautions during their construction, and are rather expensive.

SUMMARY OF THE INVENTION

The object of the present invention is that of providing a support and guide structure of the type which has been briefly described, which will be free from the disadvantages which have been indicated and therefore allow the windows to be positioned in such a way that the outer surface thereof is rigorously aligned with the outer surface of the parts of the motor vehicle body contiguous to the windows themselves; which does not have any substantially visible parts along the edges of the window; which, as well as the vertically movable windows also allows the presence of fixed windows, contiguous to them and forming with them a substantially single surface having no discontinuities and which, finally, is constituted by a few structural elements of simple form which can be produced at low cost.

These objects are achieved by means of a support and guide structure for the windows of the body of a motor vehicle having at least one door with a substantially vertical movable window which is delimited by a pair of lateral edges and by an upper edge, characterised by the fact that it includes a pair of support elements for the said window, of elongate form and each of constant cross-section and including an abutment tongue to allow engagement of that part of the rear surface of the window which is contiguous to one of the said lateral edges, a frame tongue orthogonal to the first and adapted to surround the said lateral edge of the window, a guide tongue parallel to the said abutment tongue, disposed rearwardly of it and projecting towards the central part of the said window, and a connection wall connecting together the said abutment tongue and the said guide tongue; a pair of elongate guide elements having a constant U-shape cross-section each of which is adapted to guide a corresponding support element during movement of the window, and each of which comprises a pair of parallel guide tongues defining, with a base wall, a guide channel for the said guide tongue of a corresponding support element, each of the said guide elements being fixed to a corresponding upright.

BRIEF DESCRIPTION OF THE DRAWINGS

For a better understanding of the present invention a more detailed description will now be given, by way of example, with reference to the attached drawings, in which.

DETAILED DESCRIPTION OF THE INVENTION

Figure 1:
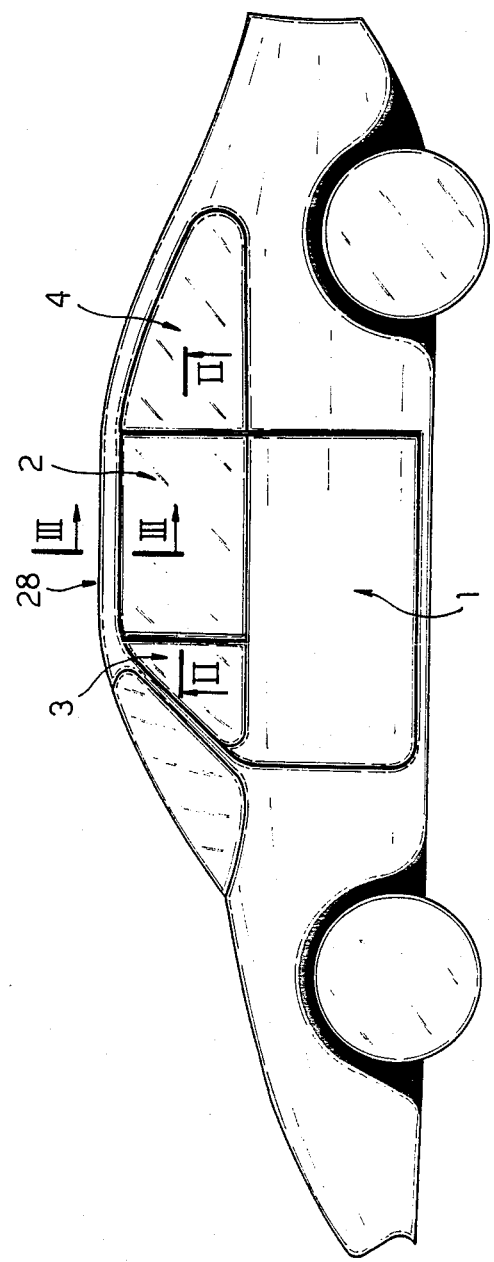
FIG. 1 is a side view of a motor vehicle body provided with the structure of the invention.

The support and guide structure of the invention is particularly adapted to be used in a motor vehicle body of the type such as that illustrated in FIG. 1, having a door 1 provided with a vertically movable window 2 and a fixed window 3 disposed contiguously with respect to the movable window, as well as a second window 4 which is not vertically movable and which is disposed to one side of the window 2.

This structure substantially comprises a pair of elongate window support elements of constant cross-section generally indicated with the reference numeral 5 (FIG. 2); each of these comprises, in turn, an abutment tongue 6 adapted to allow that part of the rear surface 7 of the window which is contiguous to one of the lateral edges 8 of the window itself to contact it, and a frame tongue 9 orthogonal to the abutment tongue and adapted to surround the said edge of the window. The support element 5 further includes a guide tongue 10 parallel to the abutment tongue 6, disposed rearwardly of it and projecting towards the central part of the window as is clearly seen in FIG. 2. A connection wall 11 joins together the abutment tongue 6 and the guide tongue 10. The structure further includes a pair of elongate guide elements of constant U-shape cross-section, generally indicated 14, each of which is able to guide a corresponding support element 5 during movement of the window; each of these guide elements comprises a pair of parallel guide tongues 15 defining, with a base wall 16, a guide channel for the guide tongue 10 of a corresponding support element 5. Each guide element 14 is fixed to a corresponding upright 17 of the door.

Each guide element 14 further includes an attachment tongue 18 disposed substantially in the same plane as one of the guide tongues 15 and forming a single wall with it; this wall is arranged to be connected to the upright 17 of the door in any convenient manner, for example by means of a suitable layer of adhesive. An elongate seal element 19 of constant cross-section is attached to the attachment tongue 18, which seal element has a pair of deformable longitudinal tongues 20 each of which can engage on the rear surface 7 of the window and each of which faces the corresponding lateral edge 8 of the window itself.

Figure 4:
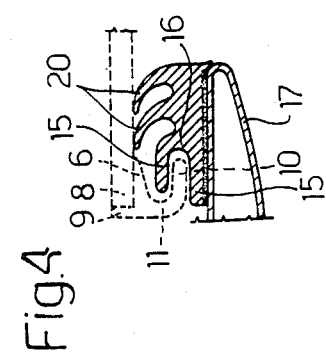
FIG. 4 shows an alternative form of the guide elements of the structure of FIG. 2.

The said seal elements are conveniently made of a material more deformable than the material with which the support elements 5 and guide elements 14 are made. These latter elements can be made of a hot formable synthetic material such as a thermoplastic material; similarly, the seal elements 19 can also be made of a material of the same type. In the embodiment illustrated in FIG. 4, each guide element 14 is made in one piece with the corresponding seal element 19: this can be achieved by coupling, in a known way, extruded profiles of different materials having a different rigidity.

Figure 3:
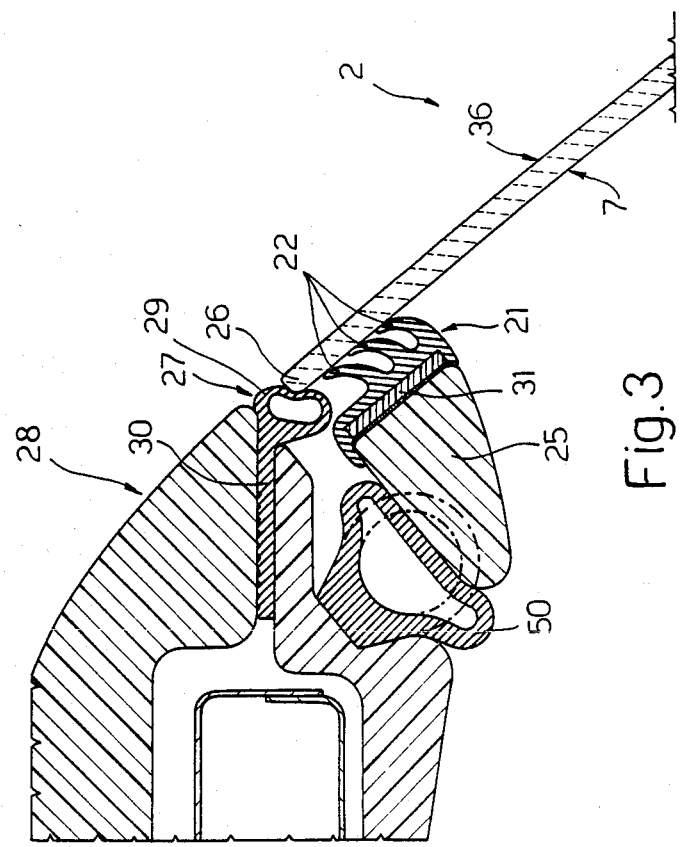
FIG. 3 is another section of the structure of FIG. 1 taken on the line III—III.

The structure of the invention also includes a second elongate seal element of constant cross-section, generally indicated 21 (FIG. 3) which has a plurality of longitudinal lips 22, for example three; this latter seal element is fixed to the upper cross piece 25 of the door and is able to allow the part of the rear surface 7 of the window 2 which is located close to the upper edge 26 of the window itself to engage against it; each of the lips 22 faces towards the upper edge 26, as is clearly seen in FIG. 3.

A third seal element 27, also of elongate form and constant cross-section, is fixed to the roof 28 of the motor vehicle body and has a deformable tubular part 29 which can come into contact with the edge 26 of the window when this is located in the closure position illustrated in FIG. 3; this seal element has a tongue 30 which can be inserted between a pair of structural elements of the roof to fix the seal element to the roof itself. Conveniently the seal element 21 is provided with a reinforcing plate 31.

The fixed window 3 of the door (FIG. 2) has a front surface 35 which is substantially aligned with the front surface 36 of the window 2; the part of this fixed window 3 which is contiguous to one of the lateral edges 8 of the movable window 2 is bent, in such a way as to form a flange 37 substantially orthogonal to the window itself; this latter is fixed to a wall 38 of the associated upright 17, for example by means of a layer of adhesive 39. Between this flange and the support element 5 contiguous to it there is disposed a further seal element 40 of elongate form and constant cross-section, which is fixed to the corresponding upright 17 of the door and which has at least one deformable lip 41 which can engage against the window support element 5.

The rear window 4, which is not vertically movable with respect to the motor vehicle body, has a front surface 42 which is substantially aligned with the front surfaces 36 and 35 of the windows 2 and 3 respectively, this window is supported, at least on the side which faces towards the movable window 2, by a support element 43 of elongate form and with substantially constant T-shape cross-section, having a first tongue 44 able to allow engagement of the rear surface 45 of the window 4, a second tongue 46 parallel to the first and having a front surface aligned with the front surface 42 of the window 4, as well as a third tongue 47 orthogonal to the first two and fixed to a door pillar 48 of the motor vehicle body.

Figure 2:
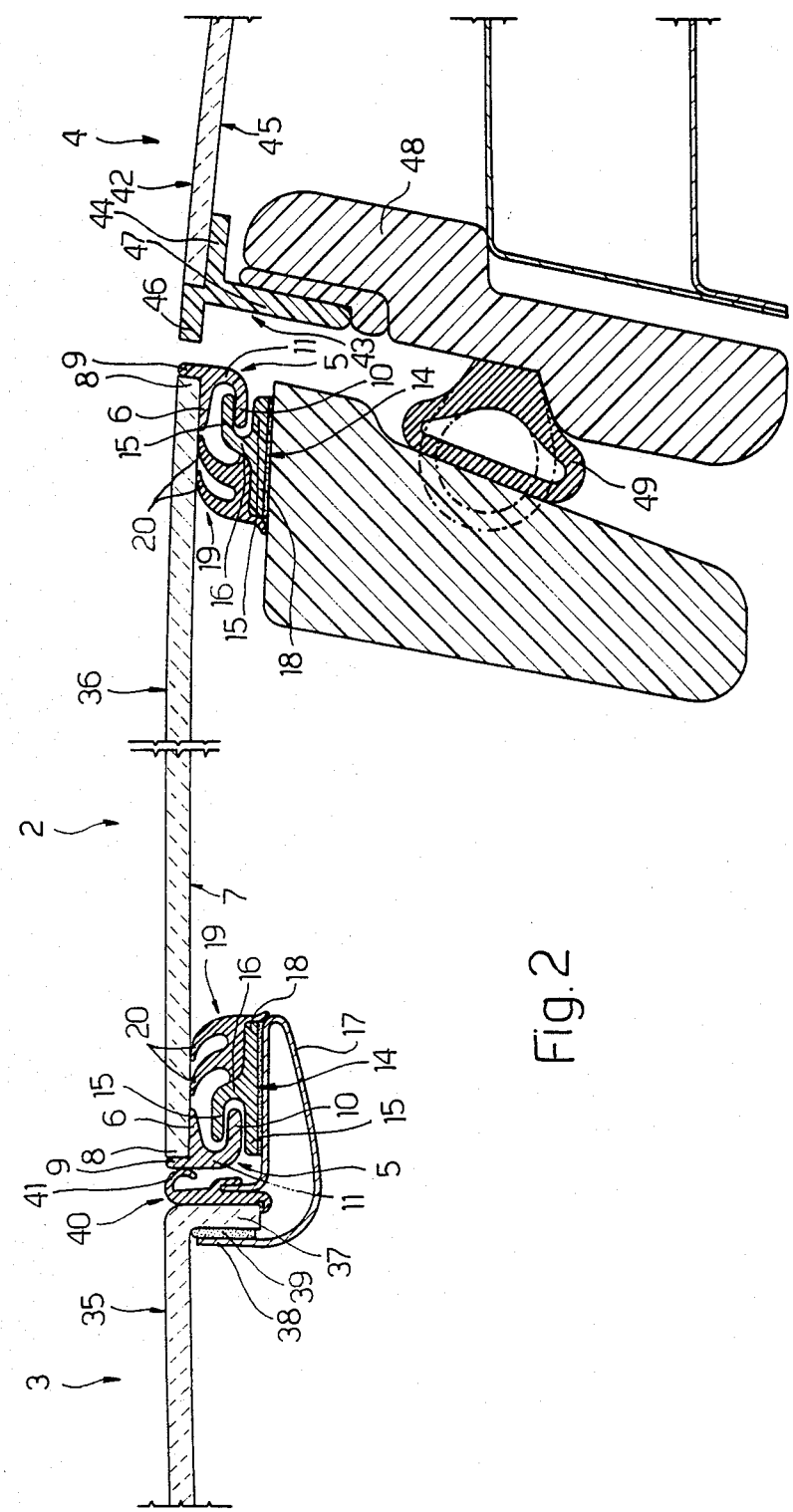
FIG. 2 is a longitudinal section taken on the line II—II of FIG. 1 showing a part of the structure.

In FIGS. 2 and 3 there have been shown further seal elements 49 and 50 of known tubular form, interposed between two contiguous door uprights and between the cross member 25 and the roof 28 of the motor vehicle body, which do not form part of the support and guide structure of the invention.

It is evident that the structure of the invention achieves a rigorous guide action of the window during its vertical movement: in fact, during this movement each guide tongue 10 of the support elements 5 is rigorously guided between the guide tongues 15 of the guide elements 14; the sealing action is also rigorous: this is ensured, laterally, by the lips 20 of the seal elements 19 which apply predetermined pressures onto the rear surfaces 7 of the window, by the labyrinth action exerted by the assembly of support elements 5 and guide elements 14, as well as by the lip 41 of the seal element 40. The seal is ensured, in correspondence with the upper edge 26 of the window, by the lips 22 of the seal element 1, as well as by the tubular part 29 of the seal element 27.

As is apparent from FIG. 2, the front surfaces 35, 36 and 42 of the three windows are aligned with the outer surfaces of the contiguous parts of the motor vehicle body, and such three windows define a single surface free from discontinuities. Between the vertical edges of the windows and between the upper edge of the window and the roof there are present parts of the support structure having very small dimensions and of very simple form, which therefore do not result in any discontinuities and which do not create losses by aerodynamic resistance. Finally, the structure comprises few parts of simple form, which can be made by manufacturing technologies which allow such parts to be produced at low cost.

It is clear that the embodiment of the present invention described can have modifications and variations introduced thereto without departing from the scope of the invention itself.

I claim:

1. A support and guide structure for the windows of a motor vehicle body having at least one door (1) with a substantially vertically movable window (2) which is delimited by a pair of lateral edges (8) and an upper edge (26), characterised by the fact that it comprises a pair of window support elements (5) of elongate form and constant cross-section, each of which comprises an abutment tongue (6) to be fixedly fastened to a part of the rear surface (7) of the window contiguous to one of the said lateral edges, a frame tongue (9) orthogonal to the abutment tongue and adapted to surround the said lateral edge of the window, a guide tongue (10) parallel to the said abutment tongue and disposed rearwardly of it and projecting towards the central part of the said window, and a connection wall (11) connecting together the said abutment tongue and the said guide tongue; a pair of guide elements (14) of elongate form and constant U-shape cross-section, each of which is adapted to guide a corresponding support element during movement of the window, and each of which comprises a pair of parallel guide tongues (15), defining with a base wall (16), a guide channel for the said guide tongue of a corresponding support element, each of the said guide elements being fixed to a corresponding upright (17) of the said door.

2. A structure according to claim 1, characterised by the fact that each of the said guide elements (14) comprise an attachment tongue (18) disposed substantially in the same plane as one of the said guide tongues (15) and forming a single wall therewith, which is arranged to be connected to the said door upright, a first seal element (19) of elongate form and constant cross-section being connected to the said attachment tongue, which seal element has a pair of deformable longitudinal lips (20) each of which is engageable on the rear surface of the said window and each of which faces towards the corresponding lateral edge of the window.

3. A structure according to claim 2, characterised by the fact that the said seal elements (20) are made of a more deformable material than that of which the support and guide elements (5, 14) are made.

4. A structure according to claim 1, characterised by the fact that the said support and guide and elements are made of a hot formable synthetic material such as a thermoplastic material.

5. A structure according to claim 1, characterised by the fact that it includes a second seal element (21) of elongate form and constant cross-section which has a plurality of longitudinal lips (22), the said second seal element being fixed to the upper cross member (25) of the said door and being adapted to allow abutment on it of the part of the rear surface of the window close to the said upper edge (26) of the window itself, each of the said lips facing towards the said upper edge of the window.

6. A structure according to claim 5, characterised by the fact that the said second seal element (21) has three longitudinal lips.

7. A structure according to claim 5 characterised by the fact that it includes a third seal element (27) of elongate form and constant cross-section fixed to the roof (28) of the said motor vehicle body and havng a deformable tubular part (29) which can come into contact with the said upper edge of the window when this is in the closure position, the said third seal element having a tongue (30) which can be inserted between a pair of structural elements of the said roof to fix the seal element to the roof itself.

8. A structure according to claim 7, characterised by the fact that the said third seal element has a reinforcing plate (31).

9. A structure according to claim 1, including a fixed window (3) for the said door disposed on one side of the said movable window, characterised by the fact that the front surface (35) of the said fixed window is aligned with the said front surface (36) of the movable window and in that the part of the said fixed window which is contiguous with one of these lateral edges of the movable window is folded in such a way as to form a flange (37) substantially orthogonal to the window itself, the said flange being fixed to a wall (38) of one of the said uprights of the door which is disposed on the side of the said flange, facing towards the said fixed window, a layer (38) of adhesive being disposed between the said flange and the said wall.

10. A structure according to claim 9, characterised by the fact that between the said flange of the fixed window and the support element (5) of the movable window which is contiguous to the said flange there is disposed a fourth seal element (40) of elongate form and constant cross-section, which is fixed to the corresponding upright of the door and which has at least one deformable lip (41) which can abut against the said window support element (5).

11. A support structure according to claim 1, in which the said motor vehicle body has a rear window (4) which is not movable vertically with respect to the motor vehicle body, characterised by the fact that the said rear window has a front surface (42) which is substantially aligned with the said front surface of the said movable window, the said rear window being supported at least on the side towards the said movable window by a support element (43) of elongate form with substantially constant T-shape cross-section, having a first tongue (44) which can be contacted by the rear surface of the window, a second tongue (46) parallel to the first and having a front surface aligned with the front surfaces of the said fixed and movable windows and a third tongue (47) orthogonal to the others and fixed to a pillar (48) of the said motor vehicle body.

* * * * *